(12) United States Patent
Watanabe et al.

(10) Patent No.: US 7,210,918 B2
(45) Date of Patent: May 1, 2007

(54) MOLD CLAMPING FORCE ADJUSTMENT DEVICE OF TOGGLE TYPE INJECTION MOLDING MACHINE

(75) Inventors: Hiroshi Watanabe, Fujiyoshida (JP); Masatoshi Senga, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 23 days.

(21) Appl. No.: 11/092,588

(22) Filed: Mar. 29, 2005

(65) Prior Publication Data
US 2005/0214407 A1 Sep. 29, 2005

(30) Foreign Application Priority Data
Mar. 29, 2004 (JP) ............... 2004-095907

(51) Int. Cl.
*B29C 45/66* (2006.01)
(52) U.S. Cl. ............ 425/150; 425/190; 425/593
(58) Field of Classification Search ........... 425/149, 425/150, 169, 190, 593
See application file for complete search history.

(56) References Cited

U.S. PATENT DOCUMENTS 3,534,442 A * 10/1970 Mahle ................. 425/150
3,819,774 A * 6/1974 Eggenberger et al. ...... 425/149
3,840,313 A * 10/1974 Grundmann et al. ......... 425/171
4,301,100 A * 11/1981 Farrell .................... 425/149
4,685,876 A * 8/1987 Loscei .................... 425/593
5,945,047 A * 8/1999 Yukihiro et al. .......... 425/150
6,589,456 B1 * 7/2003 Maru et al. .............. 425/593
6,595,766 B2 * 7/2003 Nakamoto ............... 425/149

FOREIGN PATENT DOCUMENTS

| DE | 2020053 | 11/1971 |
| JP | 62-220314 | 9/1987 |
| JP | 5-220799 | 8/1993 |
| JP | 7-96361 | 4/1995 |
| JP | 7-32024 | 7/1995 |
| JP | 10-278084 | 10/1998 |
| JP | 2001-239562 | 9/2001 |
| WO | WO 93/25368 | 12/1993 |

* cited by examiner

*Primary Examiner*—James P. Mackey
(74) *Attorney, Agent, or Firm*—Staas & Halsey LLP (57) ABSTRACT

A rear platen is moved forward toward a fixed platen as much as the amount corresponding to a mold clamping force which is set in advance, in a state in which the toggle mechanism of a toggle type mold clamping system is contracted, to detect that a fixed mold half attached to the rear platen touches a movable mold half attached to the fixed platen. When mold touch is detected, the rear platen is moved backward as much as the amount of stretch of a tie bar which is generated from the mold touch.

5 Claims, 7 Drawing Sheets

MOLD CLAMPING FORCE ADJUSTMENT DEVICE OF TOGGLE TYPE INJECTION MOLDING MACHINE

BACKGROUND OF THE INVENTION

1. Field of the Invention

The present invention relates to a mold clamping force adjustment device of an injection molding machine having a toggle type mold clamping system.

2. Description of the Prior Art

In an injection molding machine having a toggle type mold clamping system, a toggle mechanism of the toggle type mold clamping system is built between a movable platen and a rear platen. When closing the mold, first of all a movable mold half and a fixed mold half are caused to touch each other in a contraction state of the toggle mechanism. Then, the toggle mechanism is stretched and a tie bar which couples a fixed platen to the rear platen is stretched. Under such condition in which the toggle mechanism is stretched completely ("lock-up state"), a set mold clamping force is generated between the movable mold half and the front mold half by the reaction force (elastic force) of the stretched tie bar.

As above, a mold clamping force is determined based on the amount of stretch of the toggle mechanism from the time when the toggle mechanism is contracted to cause the mold halves to touch each other until the time when the toggle mechanism is stretched completely and applies the set mold clamping force to the mold halves (i.e. the amount of movement of the movable platen). Therefore, it is necessary to adjust the position of the rear platen (mold clamping force adjustment) so that the toggle mechanism is contracted as much as the amount corresponding to a desired amount of stretch to cause the mold halves to touch each other.

Examples of the conventional technologies of such mold clamping force adjustment will now be described hereinafter.

(1) Mold Clamping Force Adjustment Described in Japanese Patent Application Laid-Open No. S62-220314:

A toggle mechanism of a toggle type mold clamping system is contracted as much as the amount necessary to generate a mold clamping force that is set. A torque limit is applied to a servomotor which drives the toggle type mold clamping system, and a geared motor which drives a rear platen is rotated normally. Since an output torque of the servomotor is limited, when the mold halves touch, the toggle mechanism is contracted, and the servomotor is rotated, whereby the value of the error resistor (error value) is increased. When the error value reaches a set value, the drive of the geared motor is stopped. Thereafter, the geared motor is rotated backward, the rear platen and the movable platen (movable mold half) are moved backward, and the mold is opened. Then the movable platen is moved forward as much as the amount of the error value. Furthermore, the torque limit of the servomotor is canceled, the geared motor is rotated normally for a predetermined period of time, and the rear platen and the movable platen (movable mold half) are moved forward. By determining the position of the rear platen as above, the mold clamping force is adjusted.

(2) Mold Clamping Force Adjustment Described in Japanese Utility Model Examined Publication No. H7-32024

There is provided a thermal relay for detecting excess current of a motor for mold thickness adjustment which drives a toggle support of a toggle type mold clamping system. The toggle mechanism of the toggle type mold clamping system is caused to move forward in a state where a set mold clamping force is contracted by the necessary amount to generate. When mold touch occurs, the thermal relay detecting the excess current of the motor for mold thickness adjustment is turned off. This is detected to stop the drive of the motor for mold thickness adjustment and to finish mold thickness adjustment.

(3) Mold Clamping Force Adjustment Described in Japanese Patent Application Laid-Open No. H10-278084 and Japanese Patent Application Laid-Open No. 2001-239562:

The amount of stretch of a tie bar at the time when a toggle mechanism of the toggle type mold clamping system is driven to cause mold touch by means of certain pressing pressure is determined in advance, the amount of stretch of the tie bar is corrected, and the position of the rear platen is determined.

As described above, the toggle type mold clamping system generates a set mold clamping force by using the movement of the movable platen from the time when the mold is touched until the time when the toggle mechanism is brought to the lock-up state. To that end, the position of the movable platen at the time when the mold is touched needs to be detected accurately. If the tie bar is stretched at the time when it is detected that the mold is touched, thereby generating a mold clamping force, the mold clamping force to be generated is increased more than the set mold clamping force by that much.

In the case of the conventional technologies (1) and (2), a mold clamping force is already applied to the mold when mold touch is detected. Therefore, by using the toggle mechanism to move the movable plate as much as the amount necessary to generate a set mold clamping force, the amount of a mold clamping force which is actually generated is larger than the set mold clamping force.

In the case of the conventional technology (3) above, on the other hand, the position of the rear platen is determined so that a set mold clamping force is obtained by correcting the stretch of the tie bar that occurs at the time of mold touch. However, the motor for driving the toggle mechanism is driven in order to cause mold touch so as to obtain the amount of correction, thus a pressing force (mold clamping force) to the mold that is generated varies depending on the bending state of the toggle mechanism. Consequently, this correction amount varies depending on the thickness of the mold, thus it is necessary to measure this correction amount for every mold clamping force adjustment performed in accordance with the mold thickness, which requires time and effort in a mold clamping force adjustment work.

SUMMARY OF THE INVENTION

In a first embodiment of a mold clamping force adjustment device of a toggle type injection molding machine according to the present invention, a rear platen is moved forward in a state in which the toggle mechanism of the toggle type mold clamping system is contracted as much as the amount corresponding to a pre-set mold clamping force. When it is detected that a movable mold half touches a fixed mold half, the rear platen is moved backward as much as the amount corresponding to a compressive force generated when the movable mold half and the fixed mold half have touched each other.

In a second embodiment the mold clamping force adjustment device of the toggle type injection molding machine according to the present invention, the rear platen is moved forward in a state in which the toggle mechanism of the toggle type mold clamping system is stretched until the state when a pre-set mold clamping state is generated. When it is detected that the movable mold half touches the fixed mold half, the rear platen is moved backward as much as the amount corresponding to a compressive force generated when the movable mold half and the fixed mold half have touched each other, and the toggle mechanism is contracted until an optional state is reached, and further the rear platen is moved forward as much as the amount equivalent to the set mold clamping force.

The amount of a backward movement of the rear platen can be controlled by the position of the rear platen. The amount of the backward movement of the rear platen can be adjusted by a time for moving the rear platen backward.

Since the mold clamping force adjustment device of the toggle type injection molding machine comprises above-described configuration, the set mold clamping force can be generated more accurately and easily.

BRIEF DESCRIPTION OF THE DRAWINGS

The above-described and other objects and characteristics of the present invention may be clear from the explanations of the embodiments below with reference to the attached drawings. Among these figures.

DETAILED DESCRIPTION OF THE PREFERRED EMBODIMENTS

Figure 1:
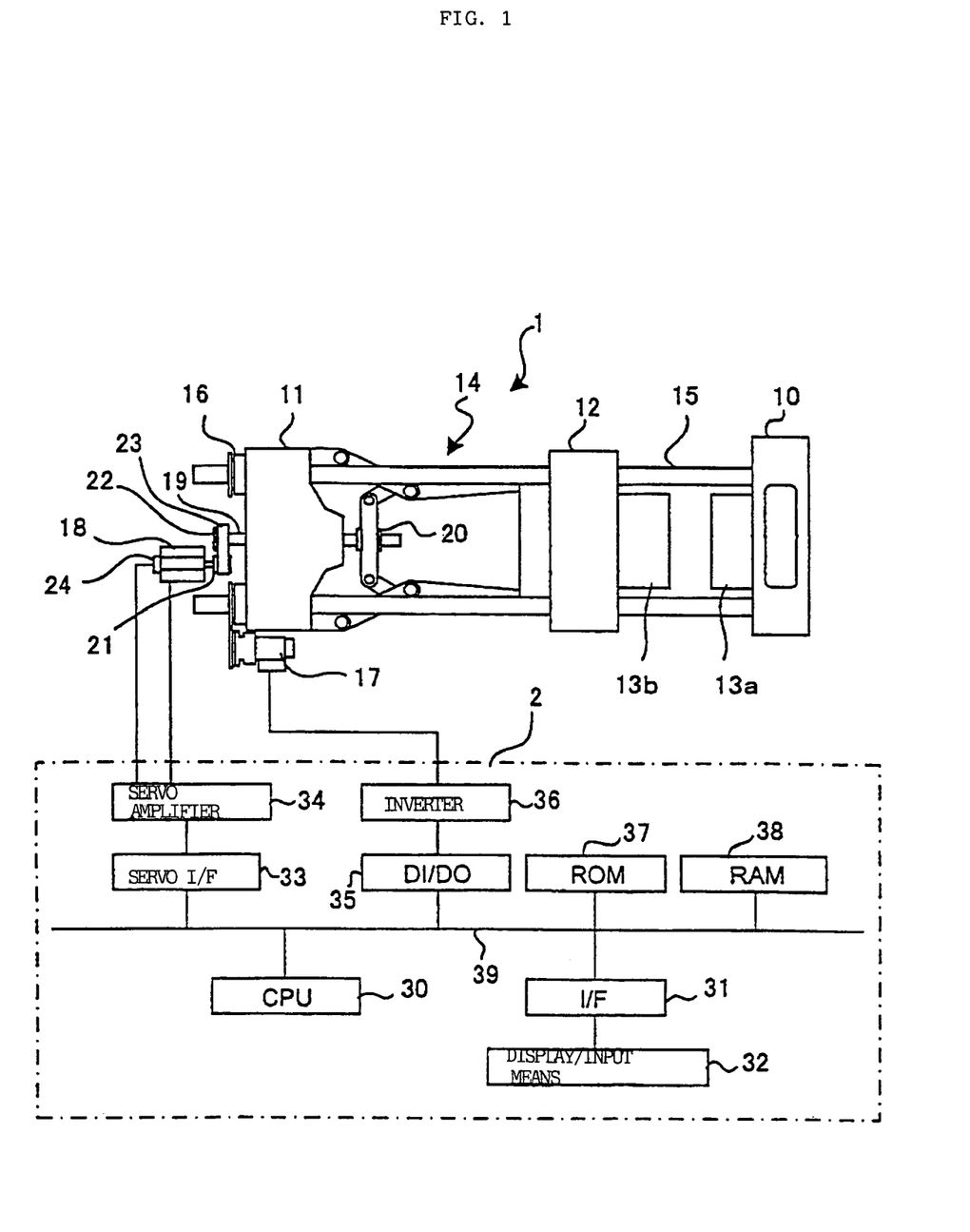
FIG. 1 is an explanatory drawing of an embodiment of the mold clamping force adjustment device of the toggle type injection molding machine according to the present invention.

FIG. 1 is an explanatory drawing of an embodiment of the mold clamping force adjustment device of the toggle type injection molding machine according to the present invention.

In FIG. 1, the numeral 1 indicates a toggle type mold clamping system, and the numeral 2 indicates a controller for an injection molding machine comprising this toggle type mold clamping system. A fixed platen 10 and a rear platen 11 are coupled to each other by a plurality of tie bars 15, and a movable platen 12 is disposed movably between the fixed platen 10 and the rear platen 11 so as to be guided by the tie bars 15. A fixed mold half 13a is detachably attached to the fixed platen 10, and a movable mold half 13b is detachably attached to the movable platen 12.

A toggle mechanism 14 is disposed between the rear platen 11 and the movable platen 12. The rear platen 11 is provided with a servomotor for mold clamping 18 for driving the toggle mechanism 14 and with a ball screw 19. The ball screw 19 is rotatably attached to the rear platen 11 such that the ball screw 19 cannot be moved in an axial direction, and the rear end (on the side opposite the movable platen 12 with respect to the rear platen 11) thereof comprises a driven pulley 22. An output shaft of the servomotor for mold clamping 18 provided in the rear platen 11 is provided with a drive pulley 21. A timing belt 23 is placed between the drive pulley 21 and the driven pulley 22, and the ball screw 19 is rotary driven by the servomotor for mold clamping 18.

A tip end portion of the ball screw 19 is screwed with a nut fixed to the crosshead 20 of the toggle mechanism 14. When the ball screw 19 is rotated, the nut and the crosshead 20 fixing the nut are moved backward and forward (the horizontal direction in FIG. 1) to stretch and contract the toggle mechanism 14, and the movable platen 12 is moved backward and forward along the tie bars 15 (horizontal direction in the figure), thereby performing operations of mold closing, mold clamping, and mold opening. Note that the numeral 24 is a position/speed detector for detecting a position and speed of the servomotor for mold clamping 18.

On the back end surface side of the rear platen 11 (on the side opposite the movable platen 12), a nut (not shown) screwing a screw (not shown) formed in the tie bar 15, and a rotating member 16 constituted by a gear are rotatably attached to the rear platen 11 such that they cannot be moved in the axial direction. Furthermore, a motor for mold thickness adjustment 17 is attached to the rear platen 11, and a gear provided in an output shaft of the motor for mold thickness adjustment 17 is coupled to a gear of the rotating members 16 respectively screwed to the tie bars 15 are coupled to each other by means of a gear transmission mechanism (not shown).

In the toggle type mold clamping system 1 of FIG. 1, adjustment of a mold clamping force is performed using the mold thickness adjusting mechanism that the injection molding machine comprises. Specifically, the adjustment is performed by driving the motor for mold thickness adjustment 17, rotating the rotating member 16, and moving the rear platen 11 forward or backward along the tie bar 15. The mold thickness adjusting mechanism is constituted by the rear platen 11, motor for mold thickness adjustment 17, rotating members 16, screw portion of the tie bar 15, and the like.

The controller 2 comprises a processor 30 for controlling the injection molding machine, and a ROM 37 storing system programs, a RAM 38 performing primary storage of data and storing various control programs, a servo interface 33, an input-output circuit 35, and an interface 31 of a display/input means 32, which are connected to the processor 30 through a bus 39.

The servomotor for mold clamping 18 which drives the toggle type mold clamping system 1 is connected to the servo interface 33 via a servo amplifier 34. Note that various servomotors besides the servomotor 18 are used as the injection molding machine, and are also connected to the controller 2; however, the functions of these servomotors are not directly related to the present invention, and thus are omitted in FIG. 1.

Moreover, an inverter 36 for driving the motor for mold thickness adjustment 17 is connected to the input-output circuit 35. The display/input means 32 which is connected to the interface 31 is constituted by a liquid crystal display, keyboard, and the like.

With the configuration above, the processor 30 of the controller 2 executes a program for a mold clamping operation and outputs a move command to the servo interface 33. The servo interface 33 performs position loop control processing and speed loop control processing on the basis of the move command, a position detected by the position/speed detector 24 attached to the servomotor for mold clamping 18, and a speed feedback signal, to perform control of drive of the servomotor for mold clamping 18. The crosshead 20 of the toggle mechanism 14 is moved by driving the servomotor for mold clamping 18, and, as a result, the movable platen 12 is moved, and the operations of mold closing, mold clamping and mold opening are carried out.

In addition, the motor for mold thickness adjustment 17 is driven by means of the inverter 36 via the input-output circuit 35, and the mold thickness adjusting mechanism is activated to move the rear platen 11 forward or backward, whereby adjusting the mold clamping force is performed. Specifically, adjustment of the mold clamping force is executed by means of the controller 2, the mold thickness adjusting mechanism (the rear platen 11, motor for mold thickness adjustment 17, rotating member 16, screw portion of the tie bar 15, and the like), and software (described hereinafter) for mold clamping force adjustment executed by the controller 2. In the present embodiment as above, the controller 2 of the injection molding machine serves also as the controller of the mold claming force adjustment device.

Figure 2A:
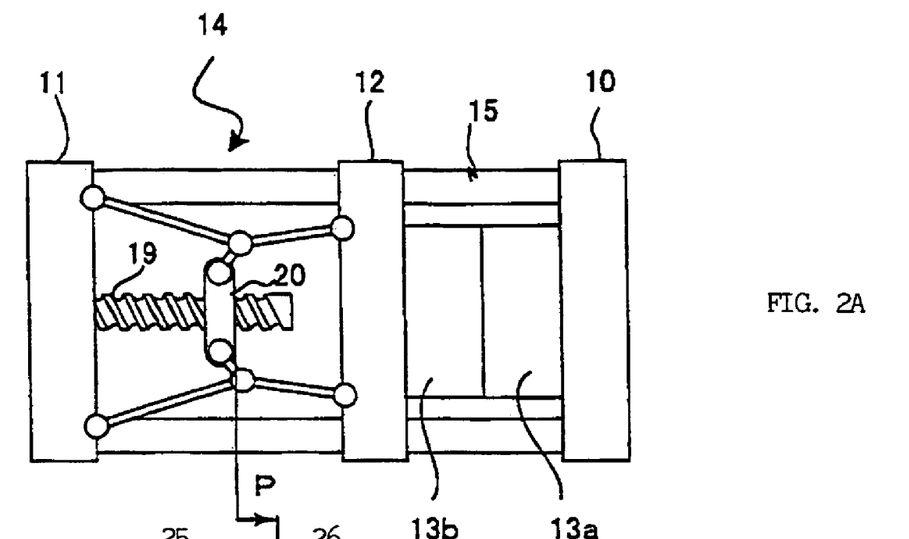
FIG. 2A and FIG. 2B are figures for explaining generation of a mold clamping force caused by a toggle type mold clamping system.
Figure 2B:
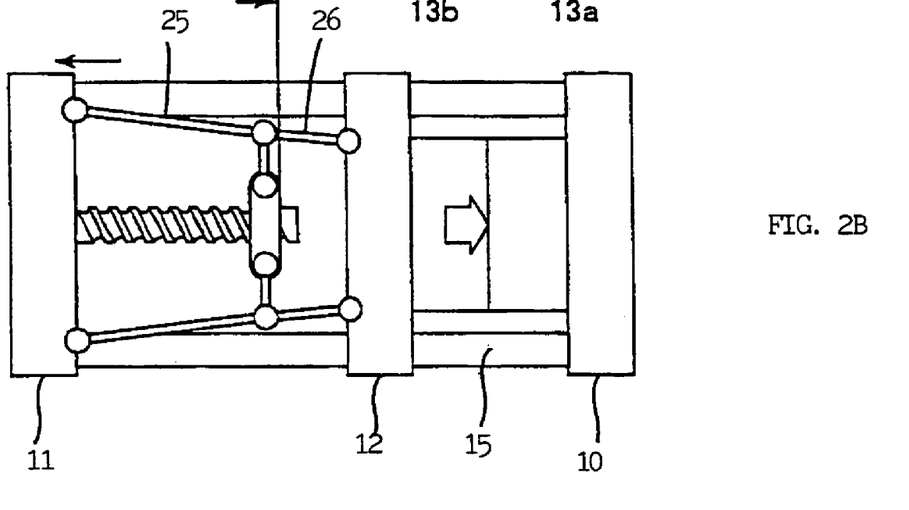

FIG. 2A and FIG. 2B are figures for explaining generation of a mold clamping force caused by the toggle type mold clamping system 1.

FIG. 2A shows a state in which the movable mold half 13b and the fixed mold half 13a touch each other in a state in which the toggle mechanism 14 of the toggle type mold clamping system 1 is contracted. When changing from the state shown in FIG. 2A to a lock-up state in which the toggle mechanism 14 is stretched by rotating the servomotor for mold clamping 18 to rotate the ball screw 19, and moving the crosshead 20 forward as far as a distance P (i.e. by arranging a first link 25 and a second link 26 in a single straight line), the state shown in FIG. 2B is reached. In this state, the tie bar 15 provided between the fixed platen 10 and the rear platen 11 is completely stretched, whereby the mold halves 13a and 13b are clamped by the counterforce thereof, and a mold clamping force corresponding to the distance P is generated.

Although the mold halves 13a and 13b shown in FIG. 2A touch each other, a mold clamping force is not generated, thus the tie bar 15 is not stretched. Furthermore, if the toggle mechanism 14 is bent to the extent which allows generation of a mold clamping force set by the toggle mechanism 14 of FIG. 2A (i.e. as long as the position of the crosshead 20 or the position of the movable platen 12 with respect to the rear platen 11 is placed in positions necessary to generate the set mold clamping force), a mold clamping force as is set can be generated when the toggle mechanism is brought to the state shown in FIG. 2B (lock-up state) from the state shown in FIG. 2A (mold touch state).

However, if the tie bar 15 is already stretched in the mold touch state in FIG. 2A and a molding clamping force is generated to some extent, a mold clamping force as is set is not obtained even if the toggle mechanism is stretched and brought from the above state to the lock-up state of FIG. 2B, whereby a mold clamping force that is larger than the set mold clamping force is generated.

Practically, it is difficult to obtain a "0" mold clamping force in a mold touch position shown in FIG. 2A. In other words, it is practically difficult to operate the toggle mechanism 14 and to position the movable platen 12 in the mold touch position shown in FIG. 2A without pressing the mold half 13b attached to the movable platen 12 against the mold half 13a attached to the fixed platen 10.

With this point in view, the present invention therefore is contrived such that the amount of stretch (generated mold clamping force) of the tie bar 15 in the mold touch position is obtained in advance as a correction amount, and an accurate set mold clamping force is obtained by using this correction amount when carrying out mold clamping force adjustment.

FIG. 3A to FIG. 3D are figures for explaining a mold clamping force adjustment operation in an embodiment of the mold clamping force adjustment device according to the present invention.

Figure 3A:
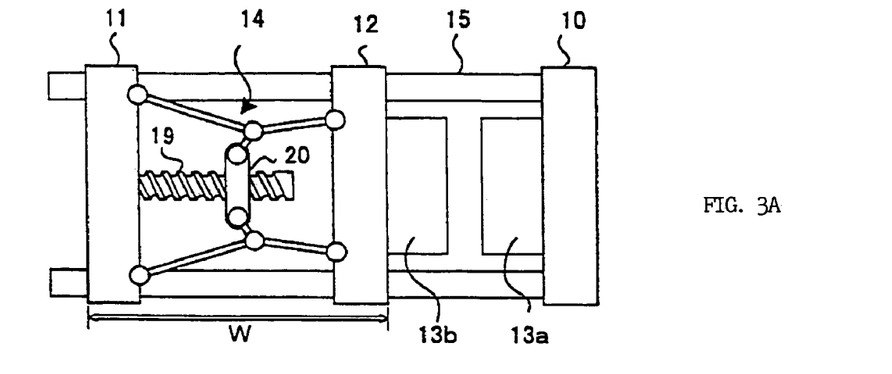
FIG. 3A to FIG. 3D are figures for explaining a mold clamping force adjustment operation in an embodiment of the mold clamping force adjustment device according to the present invention.

As shown in FIG. 3A, the mold halves 13a and 13b are attached to the fixed platen 10 and the movable platen 12 respectively. The servomotor for mold clamping 18 is driven, the ball screw 19 is rotated, and the toggle mechanism 14 is contracted, whereby the movable platen 12 is positioned in the position which is necessary to generate the set mold clamping force. Here, determining a position of the movable platen 12 is the same as determining positions of the servomotor for mold clamping 18, crosshead 20, and movable mold half 13b. Suppose that the distance between the rear platen 11 and the movable platen 12 at this time is "W".

Figure 3B:
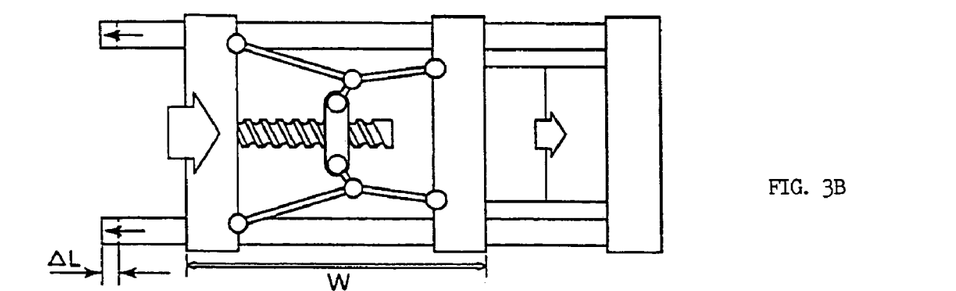

As shown in FIG. 3B, while holding the distance W between the rear platen 11 and the movable platen 12 (i.e. while holding the position of the servomotor 18 for mold clamping), the motor for mold thickness adjustment 17 is driven, the rear platen 11 is moved forward, and the movable mold half 13b is brought into contact with the fixed mold half 13a. When this mold touch is detected, driving the motor for mold thickness adjustment 17 is stopped.

This mold touch is detected by a generation of an overload signal (excess current signal) from the inverter 36 which drives the motor for mold thickness adjustment 17. The fact that the mold halves touch each other and tan overload signal (excess current signal) is generated from the inverter 36 means that the mold halves are pressed by a force corresponding to this overload signal (excess current signal) to stretch the tie bar 15, and a mold clamping force is generated. Since the force applied to the mold haves 13a and 13b at the time of mold touch is constant, the amount of stretch ΔL of the tie bar 15 becomes constant when an overload signal (excess current signal) is generated from the inverter 36 and the drive of the motor for mold thickness adjustment 17 is stopped.

Figure 3C:
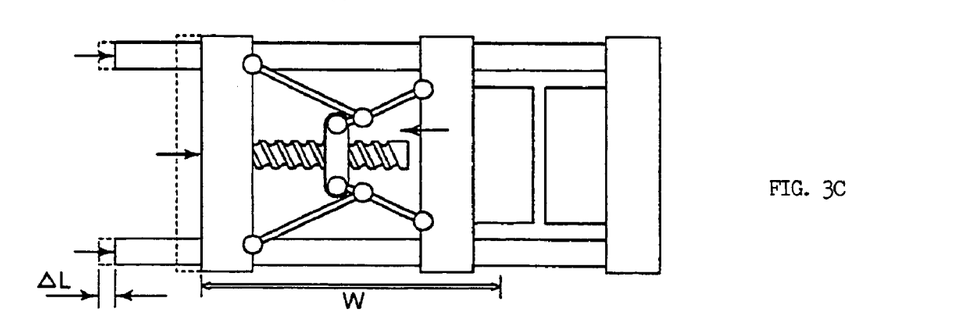

Next, as shown in FIG. 3C, the movable mold half 13b is separated from the fixed mold half 13a by driving the servomotor for mold clamping 18, rotating the ball screw 19, contracting the toggle mechanism 14, and making the distance between the rear platen 11 and the movable platen 12 shorter than the distance W corresponding to the set mold clamping force. By opening the mold as above, there no longer exists the mold clamping force and the stretch of the tie bar 15, and as a result, the tie bar 15 extending as much as ΔL in FIG. 2B is contracted as far as ΔL. At this time, the rear platen 11 joined with the tie bar 15 by screws is moved forward as far as ΔL.

Figure 3D:
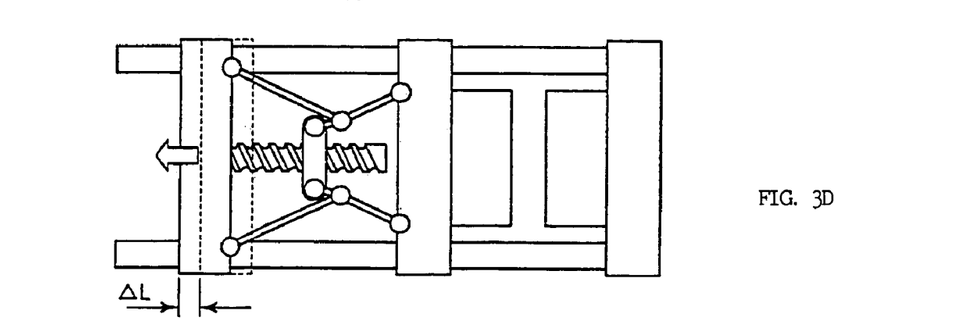

Here, as shown in FIG. 3D, the motor for mold thickness adjustment 17 is driven to move the rear platen 11 backward as far as the amount of stretch ΔL of the tie bar 15 at the time of the mold touch. Accordingly, positioning the rear platen 11 is completed, thereby completing the mold camping force adjustment operation.

As described above, first the rear platen 11 is moved forward while keeping the distance W (corresponds to the set mold clamping force) between the rear platen 11 and the movable platen 12 to conduct mold touch (FIG. 3B). Then, the rear platen 11 is moved backward, from its current position, as far as the amount of stretch ΔL of the tie bar 15 obtained in the previous mold touch.

By doing so, by driving the servomotor for mold clamping 18, rotating the ball screw 19, stretching the toggle mechanism 14, and move the movable platen 12 forward in the adjusted position of the rear platen 11, when mold touch occurs and few mold clamping force is still generated, the distance between the rear platen 11 and the movable platen 12 becomes the value W which is necessary to provide a set mold clamping force. Therefore, by stretching the toggle mechanism 14 to be brought to the lock-up state in the adjusted position of the rear platen 11, a mold clamping force with a value accurately corresponding to the distance between the rear platen 11 and the movable platen 12 is generated.

Figure 5:
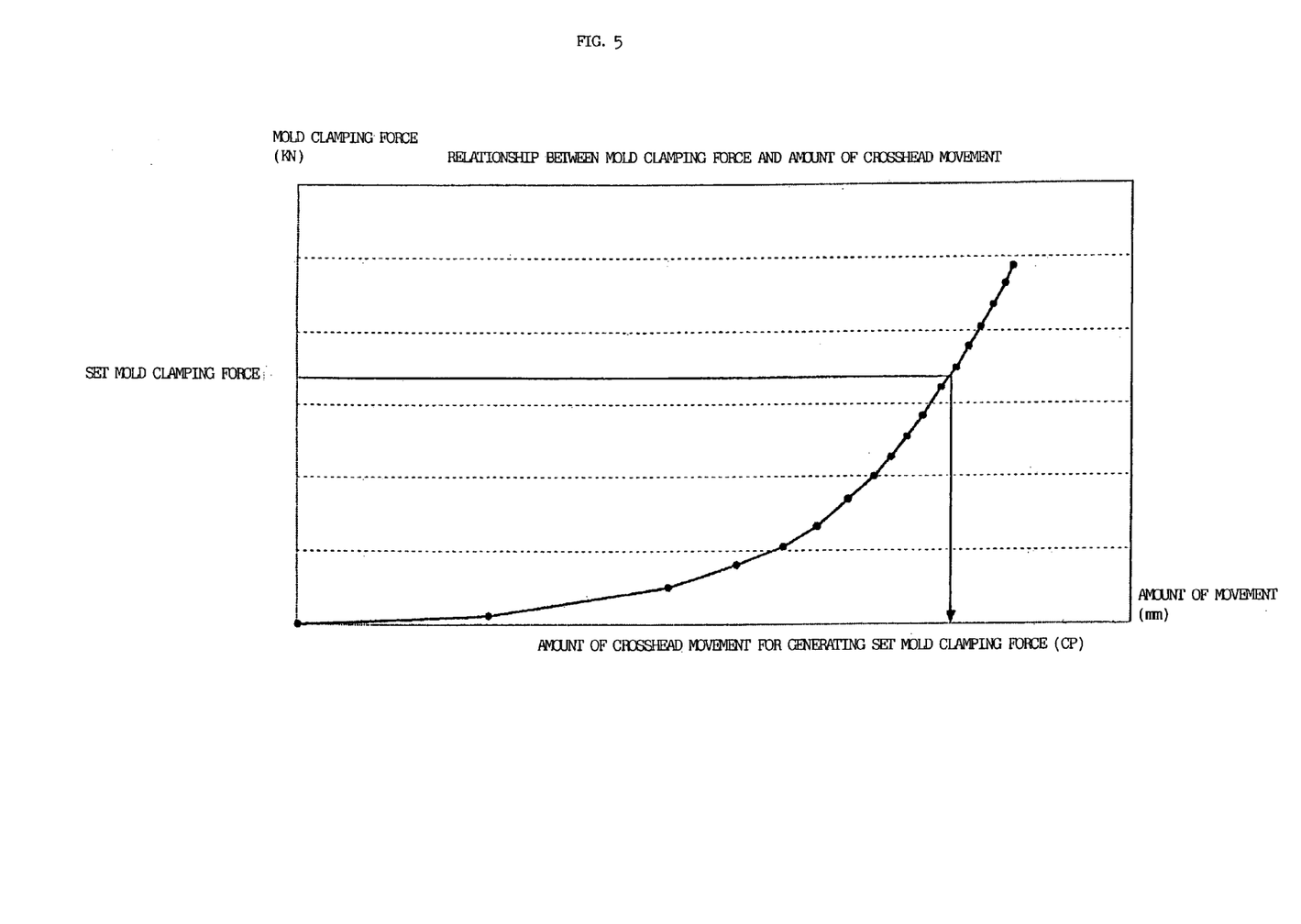
FIG. 5 is a graph showing a relationship between the amount of a movement of a crosshead from the time of mold touch to the lock-up time of the toggle mechanism and a generation mold clamping force.

FIG. 5 is a graph showing a relationship between the amount of a movement of a crosshead 20 (corresponds to the amount of movement of the servomotor for mold clamping) from the time of mold touch (FIG. 2A) to the lock-up time (FIG. 2B) of the toggle mechanism 14 and a generated mold clamping force. If a mold clamping force to be generated with respect to the selected mold halves 13a and 13b is set, the amount of movement of the crosshead 20 which is necessary to provide the set mold clamping force can be obtained from this graph. The amount of movement of the crosshead 20 is stored in a form of the amount of movement of the servomotor for mold clamping in a predetermined region in the RAM 38 of the controller 2. Further, a worker may set and input the amount of movement of the crosshead in accordance with the set mold clamping force by using the graph of this relationship.

When driving the motor for mold thickness adjustment 17, moving the rear platen 11 and the movable platen 12, and pressing the movable mold half 13b against the fixed mold half 13a (FIG. 3B), an overload signal (excess current signal) is generated from the inverter 36. The stretch of the tie bar 15 at the time when this overload signal is detected, i.e. the amount of stretch ΔL shown in FIG. 3B, is obtained in an experiment in advance. Furthermore, a drive time ΔT of the motor for mold thickness adjustment 17 necessary to move the rear platen 11 backward as much as the amount of stretch ΔL is obtained in an experiment in advance and stored in the controller 2.

Figure 4:
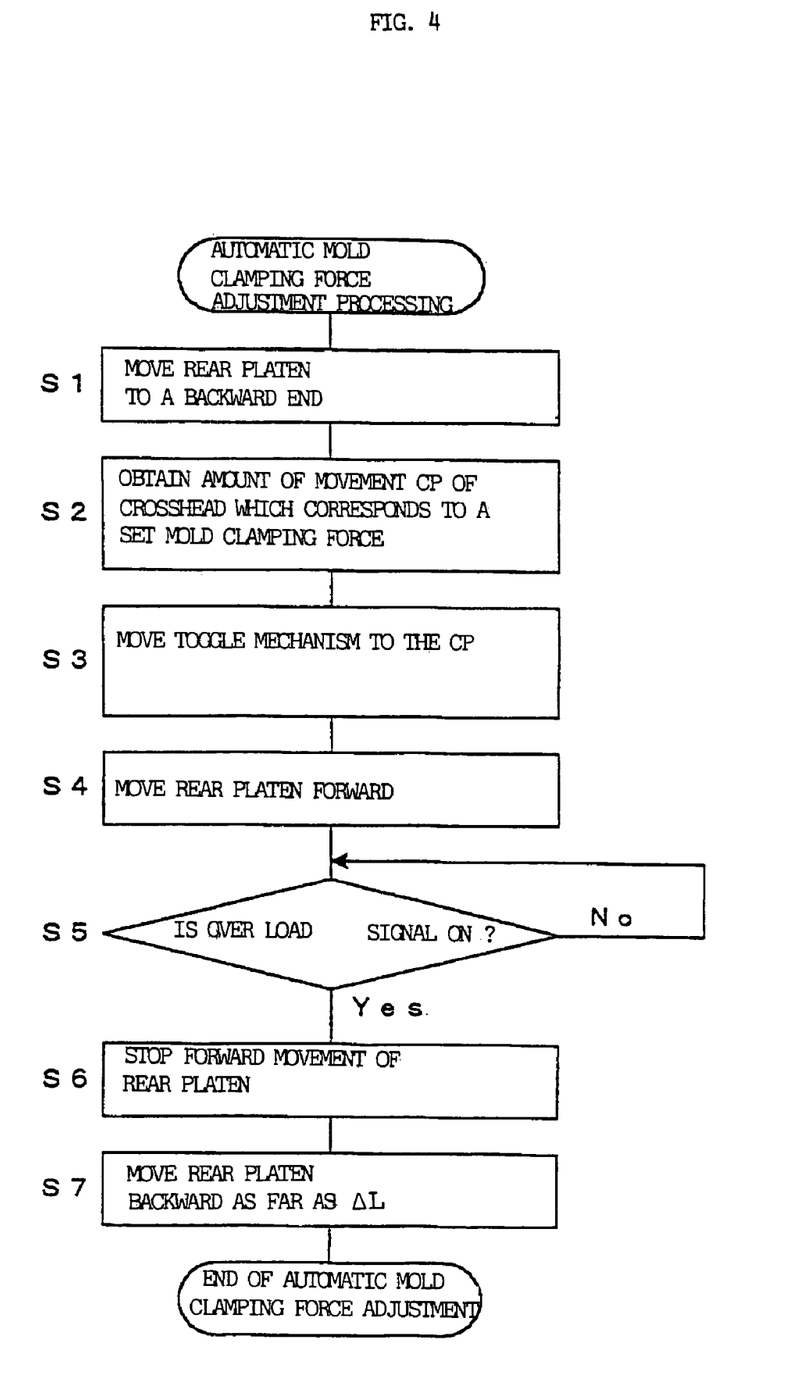
FIG. 4 is a flow chart showing a mold clamping adjustment work.

FIG. 4 is a flow chart showing a mold clamping adjustment work.

When a mold clamping force adjustment command is input, the processor 30 of the controller 2 activates the motor for mold thickness adjustment 17 through the input-output circuit 35 (FIG. 1) to move the rear platen 11 backward to a set backward end (Step S1). Next, an amount of movement CP of the crosshead 20, which is necessary to provide a set mold clamping force, is obtained by means of the data of the relationship (FIG. 5) between the amount of movement of the crosshead 20 of the toggle mechanism and the generated mold clamping force (Step S2). Then the servomotor for mold clamping 18 is driven and the crosshead 20 is moved to CP (Step S3). Due to this movement of the crosshead 20, the movable platen 12 is moved toward the rear platen 11, whereby the distance between the movable platen 12 and the rear platen 11 becomes the distance W corresponding to the set mold clamping force (FIG. 3A).

Next, the motor for mold thickness adjustment 17 is driven and the rear platen 11 is moved forward (Step S4). Then, it is monitored whether or not an overload signal (excess current signal) is generated from the inverter 36 which drives the motor 17 (Step S5). If an overload signal (excess current signal) is detected, the drive of the motor for mold thickness adjustment 17 is stopped to stop the forward movement of the rear platen 11 (Step S6). In this state the tie bar 15 is stretched as much as ΔL, as shown in FIG. 3B.

Next, the motor for mold thickness adjustment 17 is driven for a period of time ΔT, which is set, and the rear platen 11 is moved backward as much as the distance ΔL (Step S7). Accordingly, the distance between the rear platen 11 and the movable platen 12 becomes the distance W corresponding to the set mold clamping force when mold touch occurs (also when less mold clamping force is generated). Consequently, the mold clamping force adjustment work is finished.

Figure 6:
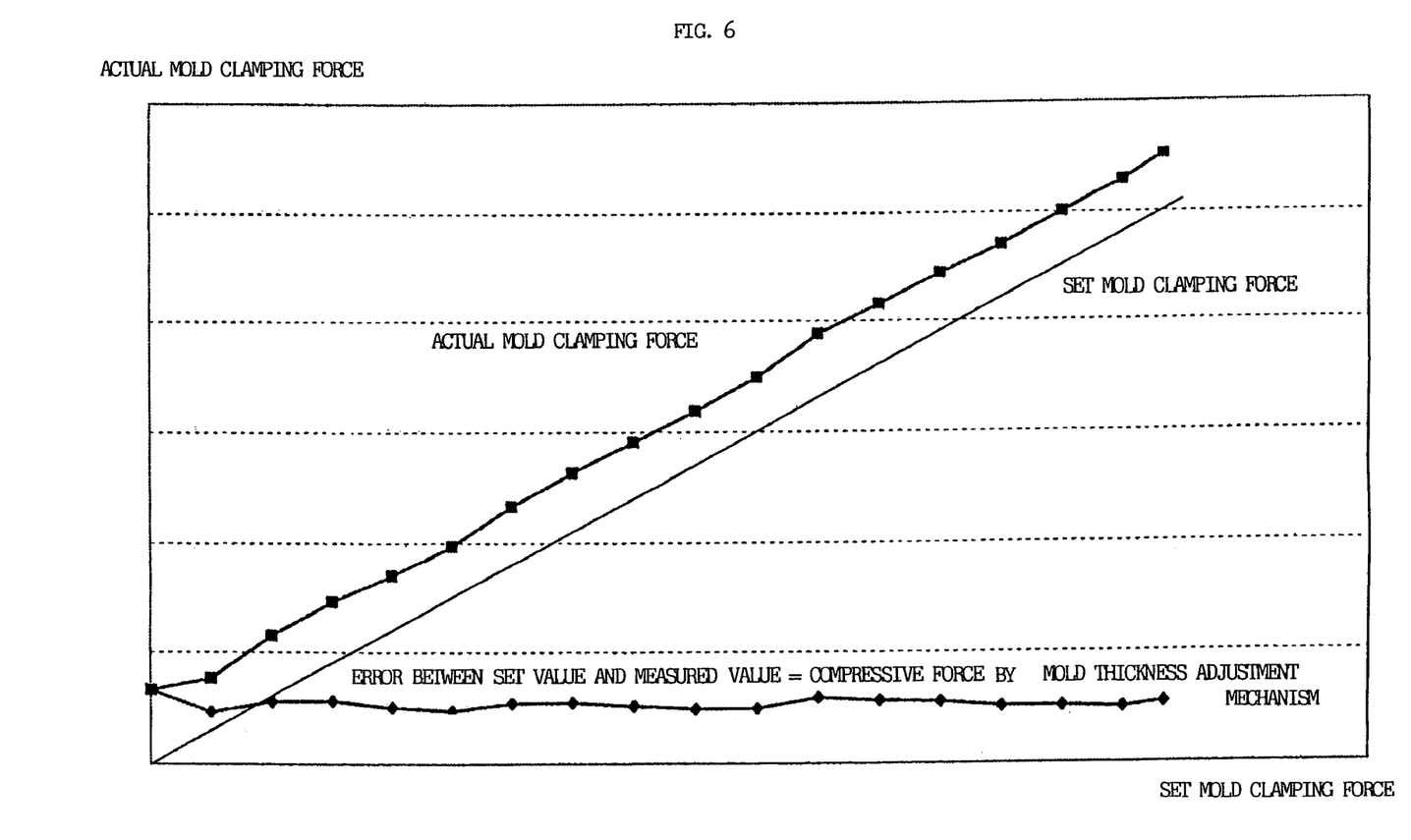
FIG. 6 illustrates a set mold clamping force and a mold clamping force generated when setting the set mold clamping force without correcting the stretch of the tie bar at the time of mold touch.
Figure 7:
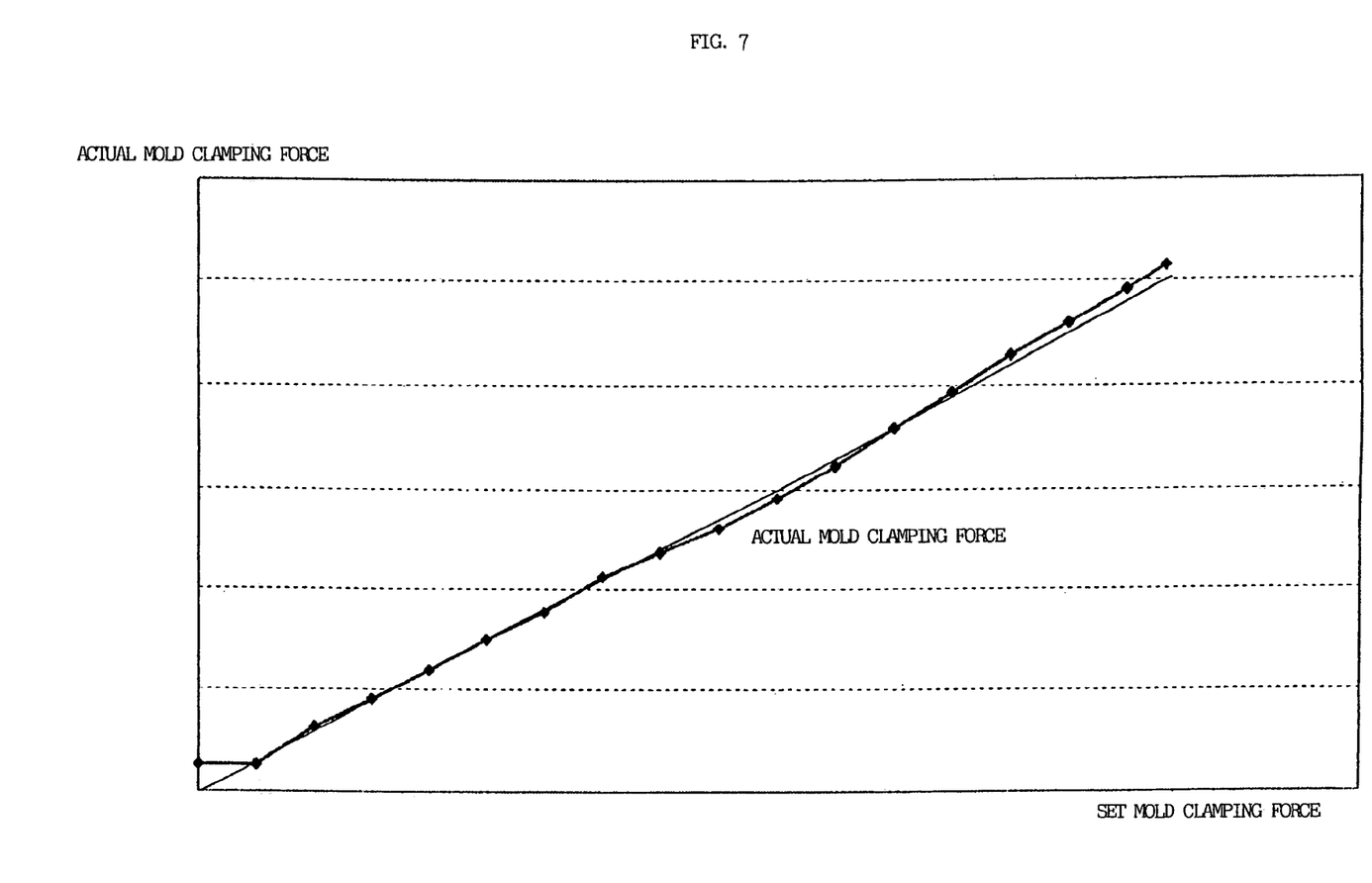
FIG. 7 illustrates a set mold clamping force and a mold clamping force generated when setting the mold clamping force after correcting the stretch of the tie bar at the time of mold touch according to the present invention.

FIG. 6 and FIG. 7 show results of experiment for confirming the effects of the present invention with respect to the conventional technologies.

In FIG. 6 (conventional technology), an arbitrary mold clamping force is set, and the motor for mold thickness adjustment 17 is operated to move the rear platen 11 forward in a state in which the toggle mechanism 14 is contracted as much as the amount corresponding to the set mold clamping force, and mold touch is detected. When mold touch is detected, the rear platen 11 is stopped, and thereafter the toggle mechanism is driven to move the movable platen 12 forward to a lock-up position. Then, when the toggle mechanism is in the lock-up position the mold clamping force is actually measured. An "actual mold clamping force" in FIG. 6 means a mold clamping force obtained by actually measuring the mold clamping force.

As shown in FIG. 6, there is generally a substantially constant difference between the set mold clamping force and the mold clamping force that is actually generated, where the actual mold clamping force exceeds the set mold clamping force.

On the other hand, FIG. 7 is an experimental result when performing a correction according to the present invention. Specifically, an arbitrary mold clamping force is set, and the motor for mold thickness adjustment 17 is operated to move the rear platen 11 forward in a state in which the toggle mechanism is contracted corresponding amount with respect to the set mold clamping force, and mold touch is detected. When mold touch is detected, the forward movement of the rear platen 11 is stopped. Thereafter, the rear platen 11 is moved a preset correction amount ΔL backward from the stop position. Consequently, positioning of the rear platen 11 is finished. Next, the toggle mechanism 14 is driven to move the movable platen 12 forward to reach a lock-up position, and a mold clamping force at this time is detected. Through this series of works, it is found that the actual mold clamping force is substantially equated with the set mold clamping force.

In the embodiment described above, the fact that the mold halves touched each other is detected by means of an overload signal (excess current signal) outputted from the inverter. However, in the case of driving the rear platen 11 by using the geared motor, the mold touch may be detected by means of a current excess signal generated from a thermal relay incorporated in a geared motor drive circuit. Moreover, when driving the rear platen 11 by using a hydraulic mechanism, mold touch may be detected by a pressure increase signal which indicates that the pressure from a hydraulic system has reached a predetermined level. In any of the detection methods, the suppress strength of the mold halves when a mold touch detection signal is outputted is constant regardless of the thicknesses of the mold halves, thus the stretch of the tie bar 15 corresponding to this constant suppress strength is a constant amount of ΔL, which may be taken as the correction amount.

Moreover, in the present embodiment, the amount of backward movement of the rear platen 11 is determined by a time in Step S7 of FIG. 4. However, if the position sensor for detecting the position of the rear platen 11 is provided, the amount of backward movement ΔL of the rear platen 11 may be determined not by a time but by the amount of movement detected by the position sensor.

Furthermore, in the embodiment described above, the toggle mechanism 14 is contracted as necessary to provide a set mold clamping force (i.e. the toggle mechanism 14 is positioned to a place where the crosshead 20 is moved as much as CP (see Step S2 in FIG. 4) backward from the lock-up position), and the rear platen 11 is moved forward to cause mold touch.

However, with the mold thickness adjustment mechanism that comprises a position sensor for detecting the position of the rear platen 11, and the like, the toggle mechanism 14 does not necessarily have to be contracted as much as to be equivalent to the set mold clamping force. For example, the rear platen 11 is moved forward to cause mold touch while stretching the toggle mechanism 14 to the lock-up state, and the rear platen 11 may be moved backward as much as the amount of stretch ΔL (constant regardless of the state of the toggle mechanism 14) of the tie bar 15 at the time of the mold touch. Accordingly, the state of mold touch can be obtained in a state in which little stretch of the tie bar 15 is observed. Then, after the toggle mechanism 14 is contracted, the rear platen 11 is moved forward by the distance corresponding to the set mold clamping force. When the rear platen 11 is adjusted to this position, the toggle mechanism 14 is brought from its contracted state to the lock-up state, whereby a mold clamping force as is set can be obtained.

In addition, as long as the toggle type mold clamping system comprises the position sensor for detecting the amount of movement of the rear platen 11 and obtains the distance between the rear platen 11 and the movable platen 12 by means of calculation using the position sensor or the position/speed detector 24, the stretch of the toggle mechanism 14 at the time of mold touch may be in any extent. A distance W1 between the rear platen 11 and the movable platen 12 at the time when the mold touch each other in an arbitrary contraction state of the toggle mechanism 14 is obtained by the position sensor or the position/speed detector 24. Next, the relationship data is used to obtain a distance W0 between the rear platen 11 and the movable platen 12 in a state in which the toggle mechanism is contracted as much as to be equivalent to the set mold clamping force. After moving the rear platen 11 backward as much as the amount of stretch ΔL of the tie bar 15 from the mold touch, the rear platen 11 is moved the amount of movement of W0 and W1, whereby the set mold clamping force can be obtained.

What is claimed is:

1. An injection molding machine comprising a toggle type mold clamping system, wherein a fixed platen and a rear platen are coupled to each other by a tie bar, a movable platen is guided by the tie bar so as to be movable between the fixed platen and the rear platen, and the toggle type clamping mechanism comprises a toggle mechanism which is positioned between the rear platen and the movable platen and which is stretched and contracted, said injection molding machine comprising:

means for contracting said toggle mechanism as much as the amount corresponding to a mold clamping force which is set in advance;

means for moving the rear platen forward toward the fixed platen in a state in which said toggle mechanism is contracted;

means for detecting that a movable mold half attached to the movable platen touches a fixed mold half, which is attached to said fixed platen, by moving said rear platen forward; and means for moving the rear platen backward along the tie bar as much as the amount of stretch of the tie bar generated from the mold touch, when it is detected that said movable mold half touches the fixed mold half.

2. A mold clamping force adjustment device of a toggle type injection molding machine, comprising:

a toggle mechanism moving motor moving a toggle mechanism of a toggle type mold clamping system forward and backward;

a rear platen moving motor moving a rear platen forward and backward;

a controller driving said toggle mechanism moving motor and said rear platen moving motor; and a detector detecting a touch of a movable mold half with a fixed mold half, caused by the forward movement of the rear platen;

wherein said toggle mechanism is contracted by said toggle mechanism moving motor as much as the amount corresponding to a mold clamping force which is set in advance, and the rear platen moving motor is driven to move the rear platen forward in a state where the toggle mechanism is kept contracted, and when it is detected by said detector that the movable mold half touches the fixed mold half, the rear platen is moved backward by said rear platen moving motor as much as the amount corresponding to a compressive force generated when the movable mold half touches the fixed mold half.

3. A mold clamping force adjustment device of a toggle type injection molding machine, comprising:

a toggle mechanism moving motor moving a toggle mechanism of a toggle type mold clamping system forward and backward;

a rear platen moving motor moving a rear platen forward and backward;

a controller driving said toggle mechanism moving motor and said rear platen moving motor; and a detector detecting a touch of a movable mold half with a fixed mold half, caused by the forward movement of the rear platen;

wherein said toggle mechanism is stretched by said toggle mechanism moving motor up to a state where a mold clamping force which is set in advance is generated, and the rear platen moving motor is driven to move the rear platen forward in a state where the toggle mechanism is kept stretched, and when it is detected by said detector that the movable mold half touches the fixed mold half, the rear platen is moved backward by said rear platen moving motor as much as the amount corresponding to a compressive force generated when the movable mold half touches the fixed mold half, and the toggle mechanism is contracted by the toggle mechanism moving motor up to an arbitrary state, and the rear platen is moved forward by the rear platen moving motor as much as the amount corresponding to the set clamping force.

4. The mold clamping force adjustment device according to claim 2 or 3, wherein said rear platen moving motor is driven by said controller to move the rear platen backward by an amount based on the position of the rear platen.

5. The mold clamping force adjustment device according to claim 2 or 3, where said rear platen moving motor is driven by said controller to move the rear platen backward by an amount in accordance with a time required for moving the rear platen backward.

* * * * *